US008606090B2

(12) United States Patent
Eyer (10) Patent No.: US 8,606,090 B2
(45) Date of Patent: Dec. 10, 2013

(54) SPORT PROGRAM CHAPTERING

(75) Inventor: Mark Kenneth Eyer, Woodinville, WA (US)

(73) Assignee: Sony Corporation, Tokyo (JP)

( * ) Notice: Subject to any disclaimer, the term of this patent is extended or adjusted under 35 U.S.C. 154(b) by 175 days.

(21) Appl. No.: 13/050,161

(22) Filed: Mar. 17, 2011

(65) Prior Publication Data

US 2012/0237182 A1    Sep. 20, 2012

(51) Int. Cl.
*H04N 5/783* (2006.01)
(52) U.S. Cl.
USPC .......................................... 386/350; 386/343
(58) Field of Classification Search
None
See application file for complete search history.

(56) References Cited

U.S. PATENT DOCUMENTS

| 5,189,630 | A | 2/1993 | Barstow et al. |
| 6,973,256 | B1 | 12/2005 | Dagtas |
| 2002/0080275 | A1 | 6/2002 | Bates et al. |
| 2002/0163532 | A1 | 11/2002 | Thomas et al. |
| 2003/0011715 | A1* | 1/2003 | Kastelic .................. 348/589 |
| 2004/0223737 | A1 | 11/2004 | Johnson |
| 2007/0041706 | A1* | 2/2007 | Gunatilake .............. 386/95 |
| 2007/0079322 | A1* | 4/2007 | Sloo et al. .............. 725/19 |
| 2008/0037950 | A1 | 2/2008 | Ono et al. |
| 2010/0043040 | A1* | 2/2010 | Olsen, Jr. ............... 725/110 |
| 2011/0135283 | A1* | 6/2011 | Poniatowki et al. ...... 386/297 |

OTHER PUBLICATIONS

Rui et al., "Automatically Extracting Highlights for TV Baseball Programs," Microsoft Research, ACM Multimedia, pp. 105-115, 2000.
Wan et al., "Automatic Sports Content Analysis—State-of-Art and Recent Results," Institute for Infocomm Research, in Broadcast Asia, May 12, 2005.
Xiong et al., "Audio Events Detection Based Highlights Extraction from Baseball," IEEE Xplore, Multimedia and Expo, Jul. 2003.

* cited by examiner

*Primary Examiner* — Huy T Nguyen
*Assistant Examiner* — Eileen Adams
(74) *Attorney, Agent, or Firm* — Miller Patent Services; Jerry A. Miller (57) ABSTRACT

In certain implementations, a method consistent with the invention involves at a television receiver device, receiving a television program depicting a sports program, where data associated with the sports program is represented in a score graphic that is displayed on a television display overlaying images of the sports program; storing the television program depicting the sports program; analyzing the score graphic to identify a change in at least one element of data displayed in the score graphic from one video frame to a subsequent video frame; and storing a chapter mark associated with the time that the change in the element of data displayed in the score graphic occurred. This abstract is not to be considered limiting, since other embodiments may deviate from the features described in this abstract.

31 Claims, 8 Drawing Sheets

SPORT PROGRAM CHAPTERING

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Personal Video Recorders can be used to record sports programs and the like for later viewing. A user can manually scan through the recording for highlights in order to view the sports program in a shorter amount of time.

Video production of sports programs and the like often contain on-screen graphics lasting substantially the full duration of the event, to update the viewer on important statistics such as the score and time remaining.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 5, which is made up of FIGS. 5A-5F is an example of a baseball score graphic that chronicles an illustrative succession of events in a hypothetical baseball game in a manner consistent with certain embodiments of the present invention.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sports program, segment of a multi-part series, news broadcast, etc. In particular, the term as used in this application relates particularly well to "sports programs", where the term "sport" is intended to be broadly interpreted to encompass any competitive program that has a score graphic (which might also include competitive games such as poker or other game programs that incorporate such a graphic, despite there not being a true sport or athletic component to the competition).

Reference throughout this document to "one embodiment", "certain embodiments", "an embodiment", "an implementation", "an example" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The user of a digital television (DTV) receiver with personal video recorder PVR (sometimes referred to as a digital video recorder or DVR) functionality (either internal or external) may set it up to record a sports program such as a baseball, football, or basketball game. Often, when the user comes back later to view the recording, they do not have time to view the entire broadcast and would like to skip ahead to various "highlight" moments. Using the example of a baseball game, the user could choose to review just a) scoring plays; b) plays resulting in one or more outs; c) plays resulting in base runners moving; d) plays resulting in home runs; e) home runs; f) double plays, or any logical combination of those, among other possibilities. With a football game, one may wish to only view scoring plays, changes of possession, etc. With today's PVR functionality, the user may manually fast-forward to areas of interest, but if distracted may miss a desired scoring play or the like. Furthermore, a measure of close attention and effort is required during the fast-forwarding to position the playback at all points of interest within the game.

In accord with implementations consistent with embodiments of the present invention, an automated method for deriving chapter points associated with the highlights can be provided. It has been observed that such chapter points can often be deduced from observation of the on-screen graphical images that form a part of a television presentation of a sports program. A "score graphic" is a video overlay provided by a broadcaster that gives the viewer an ongoing snapshot of current data about a game in progress such as the score, timing, and other game status information. The video images can be sampled from the broadcast and used to set chapter points corresponding to areas of the game having a high probability of being of interest due to changes identified in the score graphic. Such changes in the score graphic can be referred to as "score graphic events" or simply "events" or the like. The term "event records" can be used herein to denote the information associated with a score graphic event, such as the timing of the event, what element(s) changed, and the to/from values of the elements. These event records can be saved at the receiver in any suitable format. The points in playback time are marked using "chapter marks", which can be implemented in a manner similar to that used for marking other chapter points in an audio/video program. "Chapter marks" can be used herein to denote marks or stored times that are associated with changes (events) in a score graphic that are likely to represent points of playback time where significant points of interest occur during the course of a sporting program. Such chapter marks may be stored and conveyed in any suitable manner for use by the viewer in retrieval of content starting at or near the chapter point as described herein.

Figure 1:
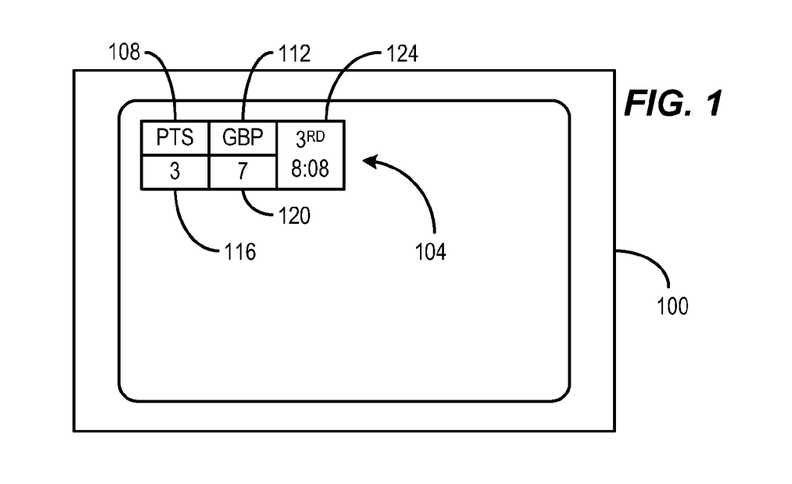
FIG. 1 is a drawing depicting a television display with a "score graphic" as is used in implementations consistent with certain embodiments of the present invention.
Figure 2:
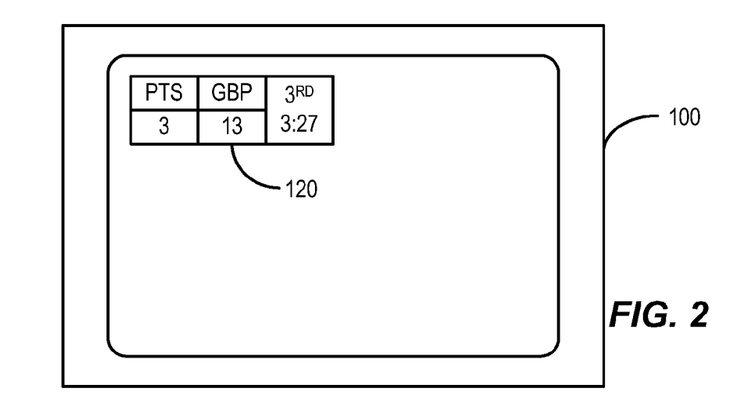
FIG. 2 is another drawing of the television display after a touchdown score is posted to the score graphic as is used in a manner consistent with certain embodiments of the present invention.
Figure 3:
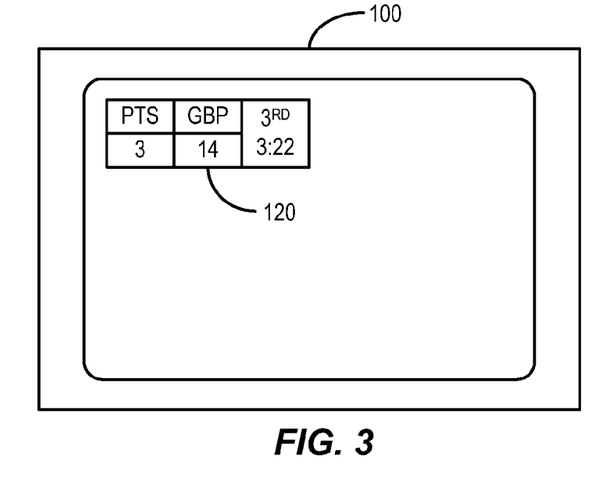
FIG. 3 is another drawing of the television display after a point-after-touchdown score is posted to the score graphic as is used in a manner consistent with certain embodiments of the present invention.

With reference to FIGS. 1-3, an example of a score graphic used in a football game is depicted on a television display 100. In this example, referring first to FIG. 1, a simple score graphic 104 is depicted in which the two teams playing American style football are identified on the left side as PTS and GBP in blocks 108 and 112. Each team's score is shown below their identifiers in blocks 116 and 120. The quarter and time remaining in the quarter appears in block 124. It will be understood that the score graphic appears as an overlay over the images from the actual game as it is being played, and the overlay is created by the network in producing the television show of the game and is hence encoded, for example, within the broadcast video image (as opposed to being formed by accompanying metadata that is rendered at the TV set).

The score graphic generally appears in a consistent location on the display frame and can therefore be readily identified either in advance by knowledge of the way such score graphics are presented by each network, or by searching for an area of the display that is relatively static or any other suitable technique. Hence, once the score graphic is identified and located on the display, it can be analyzed (e.g., by pattern matching and/or character recognition technology) for a substantial amount of information that is directly related to many game highlights.

By way of example, in FIG. 1, the score is shown to be 7 to 3 in favor of GBP. When the score graphic display changes in certain areas, it is apparent that a significant play has occurred in the football game. It is noted that some changes are generally insignificant such as seconds ticking off of a clock (usually with possible exceptions such as final seconds of a tied game, which may be a significant play but could also be represented by detection of a time of 0 on the clock).

In this example case, consider FIG. 2 in which the score has changed in box 120 to 13 to 3 in favor of GBP. If the information in box 120 is monitored by the television system, it is readily deduced that just prior to the score graphic change, a significant play has taken place. In this case, a touchdown has been scored by GBP. Hence, if the recording is chapter-marked either at the point of the score change or some reasonable time in advance of the score change, the viewer can easily move to that point to view the play by simply activating a remote control instruction to jump to the next chapter mark. In the case of football, the viewer may wish to advance to approximately one real minute (for example, versus game minute) prior to the score change. The viewer can then view the scoring play which is a likely candidate for a highlight.

Similarly, FIG. 3 shows the score again changing at 120 by a single point, which suggests a successful point-after-touchdown kick. With this simple example in mind, one can readily deduce how an event or combination of events can lead to a deduction that play of interest has just occurred in the recorded game that has high potential to be a highlight moment. It will also become evident upon consideration of the present teachings that certain games are very amenable to analysis in this manner to produce a high likelihood of creating chapter points that are close to game highlight moments. It is likely, for example, that games with lower numbers of scoring plays such as baseball, football, soccer, and hockey are very likely to be conducive to successful and efficient analysis (producing a sequence of highlights that can compress a game of several hours into several minutes) whereas games with many scoring plays such as basketball may not be as productively analyzed in this manner. That notwithstanding, most programs having a score graphic can be analyzed using techniques consistent with the present teachings.

It will also become evident upon consideration of the present teachings that different plays in different sports may be conducive to different amounts of viewing time prior to a score graphic event (a change in any feature of the score graphic display). It will become equally evident upon consideration of the present teachings that more events tracked in the score graphic can lead to a more detailed analysis of events that can be logically combined to deduce that a particular event has occurred that can be marked to delineate chapter points for subsequent playback.

Figure 4:
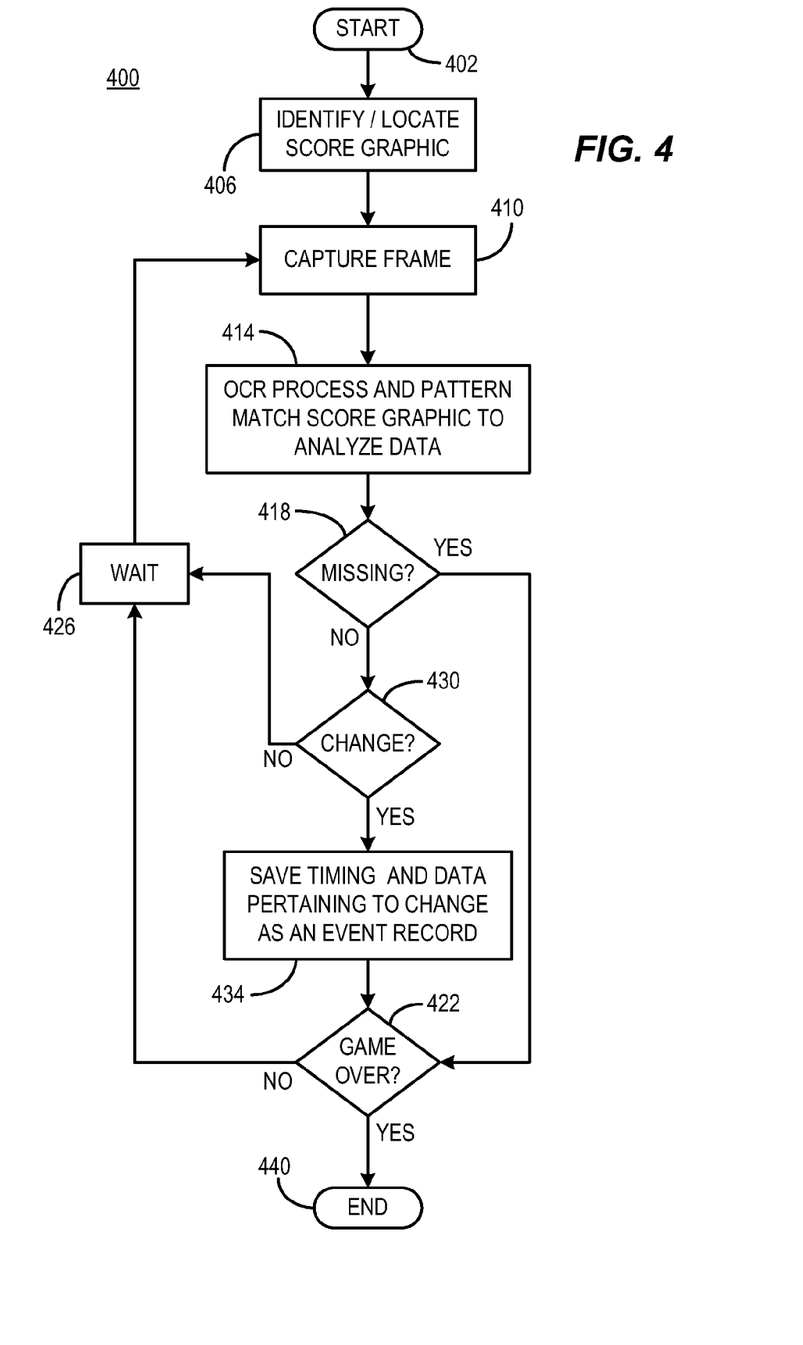
FIG. 4 is an example of a flow chart of an illustrative chapter marking process that operates in a manner consistent with certain embodiments of the present invention.

In any case, the basic process that is used with implementations consistent with the present invention is depicted in FIG. 4 as process 400 starting at 402. At 406, any suitable process is used to identify and isolate the location of a score graphic in the presentation on the display. This can be accomplished using a number of techniques including referencing a catalog of data regarding such score graphics. For example a television receiver device (TV, Set-top Box, PVR, etc.) may be able to readily determine what channel is being tuned, which network the channel is affiliated with and what game is being presented from metadata used for purposes of a generation of an electronic program guide (EPG). Or, a user can explicitly identify the score graphic in some manner. Or, the display can be scanned for information that identifies a segment of the screen as being dedicated to presentation of the score graphic. Video samples taken over a period of time can quickly identify rectangular areas in which few if any frame-to-frame changes occur (e.g. static graphics). In any case, once the score graphic is identified in the display, it generally remains in place for most of the game except for commercial breaks, commentary breaks, half-time, time-outs and other such occurrences. The score graphic will appear with frequency on the display in a relatively fixed location and have a particular set of information that is always presented. In the prior example, the score graphic is very simple and presents only the teams, score, time and quarter. However, more information is often presented in score graphics as will be discussed later.

Once the score graphic is identified and located, the area of the frame including the score graphic image is captured at 410 (which may simply involve reading a portion of the information stored in a full-frame video buffer). This frame image is then processed at 414 using an OCR engine and/or pattern analysis or pattern matching algorithms to extract the available data from the score graphic. If the analysis determines at 418 that the score graphic is missing, then the situation may be only temporary and due to a commercial break or a change in picture to commentators or other temporary situation. Assuming it is determined at 422 that the game or recording is not actually ended, the process waits for a reasonable period of time (perhaps 1-5 seconds) at 426 and a new frame is captured at 410 and analyzed at 414.

When the score graphic has returned or is not deemed missing at 418, the process analyzes the score graphic to see if any relevant information has changed (other than perhaps only game time information) at 430. Whenever a significant change takes place (where significance can be determined by a change that could potentially represent a score or possible highlight play, e.g., if a significant number of replays is presented by the network—this may cause the score graphic time to actually change direction as the replay is presented) then the time of the change in the score graphic, as well as other pertinent data (exactly what changed, and the to/from values) are recorded as a part of the event record at 434. Via a separate process, the timing and types of changes in the score graphic can be filtered and converted to chapter points to permit the viewer to quickly review highlights of the game by use of a chapter advance remote control button for example, so as to be able to skip less interesting portions of the game.

The analysis of the score graphic events proceeds in this manner every time interval (e.g., every several seconds) until the game ends at 422 at which point the process ends at 440. At this point, the viewer has a stored copy of the entire game (or whatever time span was designated for recording) which can be either viewed in its entirety or viewed in an abbreviated manner by jumping from highlight to highlight in a manner which will be described later.

The event records created using the above process can be stored in any suitable manner and format that can be readily retrieved during a playback process in order to facilitate the user skipping from one highlight to the next, where the event records can include frame numbers, or playback times or any other convenient data representation. It is noted that the chapter marking process described above may be carried out as the sports program is being presented (in near real time) or as a post storage processing action without limitation.

FIGS. 5A-5F, show an example score graphic that might be used along with presentation of a baseball game. To simplify the illustration, the display itself is omitted, but it will be understood that the image of the score graphic will typically overlay a portion of the display such as an area near an upper or lower corner. The score graphic 500 indicates information about a baseball game including:

The teams playing at 504 and 508;
The current score (number of runs scored thus far by each team) at 512 and 516;
The inning at 520;
An indicator of whether it is the top or bottom of that inning at 524;
A number of outs in the inning at 528;
A pitch count (balls and strikes) also in box 528; and
A number and location of base runners at 532 as indicated graphically with a representation of a baseball diamond similar to that used in a scorer's book.

Figure 5A:
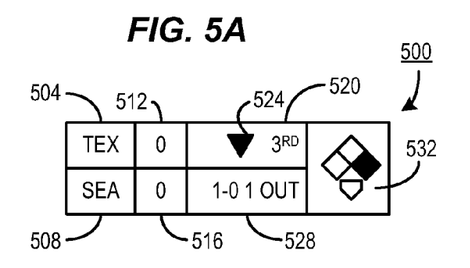
Figure 5B:
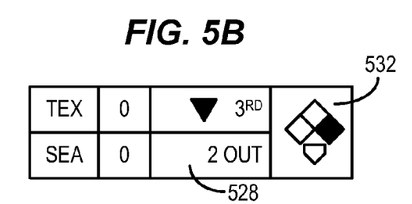

In this example of FIG. 5A, the score is 0 to 0 in the bottom (last half) of the third inning, the pitch count is one ball and no strikes, there is one out and a runner is currently on first base.

Straightforward analysis of the video samples from the recorded game can take note of any time in which the score graphic changes in certain ways, to record an event record where there is a:

Change in score;
Change in base runners;
Change in number of outs;
Change in inning (or which half of the inning); and
Change in pitch count.

At some points, changes in multiple things will occur. When this happens, or in some cases when certain isolated events happen, one can deduce not only that a significant play has taken place, but what type of play has taken place. This permits the viewer to pick and choose the types of plays he or she wishes to view as a highlight by use of selective filtering of the changes in data presented in the score graphic. Thus, certain types of plays can be determined by understanding the meaning of certain changes. For example:

A home run is indicated by a change in score corresponding to one run plus the number of base runners that were on base at the beginning of the at-bat;
A base hit or walk is indicated by a change in base runner position where first base is occupied at the end of the play and no outs were recorded;
A strikeout can be deduced if the number of outs changes or an inning (or half of an inning changes) after a count of two strikes;
Some types of stolen bases can be deduced, for example if runner advances from one base score graphic sample to another;
A grand slam occurs when the score advances by four points in one jump; and
Etc.

A full decision tree that provides for logical interpretation of single changes and combinations of changes can be readily devised by one who understands the game being played and the representation of plays in the score graphic. In the simplest of implementations, chapter marks can simply signify playback times for changes in score as in the football example of earlier. For more complex score graphics, combinations of score graphic events can be used to deduce that certain actions have or are likely to have occurred. However, it is observed that in some instances a change in an element of the score graphic can be ambiguous. Nevertheless, even ambiguities are not particularly troublesome in general since the derived information is only used to create a chapter mark and the viewer can deduce what has actually occurred by viewing the actual play and listening to the associated commentary. When the analysis deduces the type of play, this information can also be used to determine how much earlier the play of interest is likely to have started.

For illustrative purposes, consider the following sequence of plays in a baseball game depicted by the score graphic progression of FIG. 5. In the example shown, it can be readily deduced that when the score graphic changes directly from that of FIG. 5A to that of FIG. 5B that a play occurred in which either the batter or the runner at first base was put out since there is still a runner at first base shown in 532. Since this change took place with the pitch count at 1-0 at 528 and the number of outs advanced, it is clear that the batter hit the ball and the out came as a result. Hence, this may be a play that the viewer wishes to see if he or she wishes to view all field plays resulting in an out.

It is noted that as mentioned above some changes in a score graphic status can represent several possible plays. So for example, in the case of the transition leading to FIG. 5A, if a pitch count was 3 balls, 2 strikes and there is one out, and a transition is to no pitch count and a runner at first, the score graphic transition could represent at least six scenarios: 1) the batter was walked on four balls, 2) the batter got a base hit, 3) the batter reached first base on an error after a hit ball, 4) the batter was hit by a pitched ball, 5) the batter reached first on a balk, or 6) the batter stole first base. Unless the score graphic conveys more information (e.g., is more informative via a drop down window or the like, or is more complex than the score graphic shown) it is impossible to deduce which of these possibilities occurred. However, if a viewer is interested in changes in status of runners on base, such occurrence will be noted by deriving a chapter mark and the viewer still will have the opportunity to determine what exactly happened by viewing the actual playback.

Figure 5C:
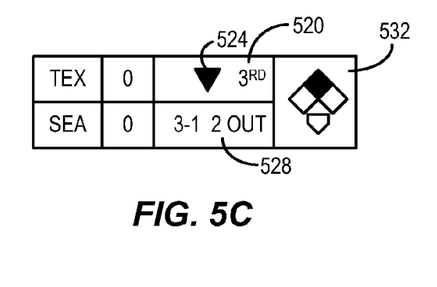

Continuing this example to transition to FIG. 5C, it is noted that the runner at 532 has advanced to second base, the count has advanced but there is no change in outs at 528 and no inning or half inning change at 520 or 524. Hence, the likely scenario in this case is that the runner at first stole second base—possibly after a wild pitch (since there are two outs). Hence, this may be a play that the viewer wishes to view if he or she wants to see all advances in base runners.

Figure 5D:
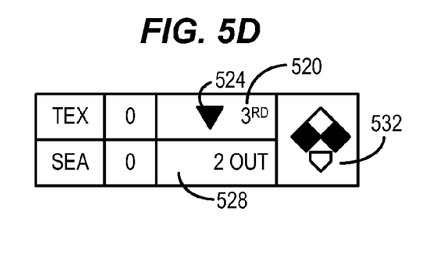

Continuing this example to a transition to FIG. 5D, it is noted that the runner at second base is shown at 532 to have advanced to third base, the count has disappeared and there is no change in outs at 528 and no inning or half inning change at 520 or 524. Hence, the likely scenario in this case is that the batter hit the ball and advanced to first base and the runner at second base advanced to third base. Hence, this may also be a play that the viewer wishes to view if he or she wants to see all advances in base runners or all hits (although an error might have occurred which is not shown in this score graphic).

Figure 5E:
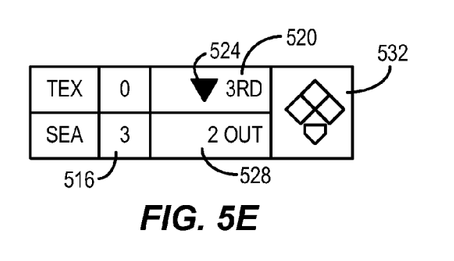

Continuing further with this example to the transition to FIG. 5E, it is noted that the runners at first and third bases are shown at 532 to have disappeared, there is no count shown and there is no change in outs at 528 and no inning or half inning change at 520 or 524. But, the score has advanced by three. Hence, the likely scenario in this case is that the batter hit a home run advancing himself and the two base runners to score. Hence, this may also be a play that the viewer wishes to view if he or she wants to see all advances in base runners or all hits (although an error might have occurred which is not shown in this score graphic) or all home runs.

Figure 5F:
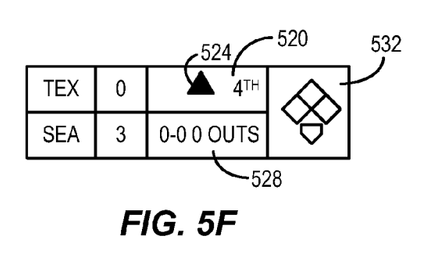

Finally continuing this example to the transition to FIG. 5F, it is noted that there are no runners on base at 532, the first pitch of the inning apparently has not been thrown as indicated further by 528 and there are no outs. However, the inning has changed to the top of the fourth inning at 524 and 520. The score has not changed, so it is apparent that the third inning has ended. This potentially represents several types of plays that may be of interest—change of inning (and possible change of pitcher from last inning) and an out (possibly a strikeout if the last count showed two strikes. Hence, the likely scenario in this case is that the batter was out on the first pitch, ending the third inning. Hence, this may also be a play that the viewer wishes to view if he or she wants to see all plays resulting in outs.

So, for example, if the user wishes to review only scoring plays those points in the program just prior to changes in the displayed scores can be filtered out and used as chapter points. "Just preceding" can be determined as a general rule, allowing for possible user adjustment and refinement after further experience with processing multiple games, but may be set to a fixed value of approximately 20 seconds for many games. This value can be refined by experimentation or established by user selection. If the user wishes to review all plays which resulted in scores or outs, again, that can be determined by taking note of changes in the score graphic. The chapter marks can be set at either the time of detection of the score graphic event, and then the video playback point backed up in time to a point just prior to that point, or the mark can be placed at the point where the user will actually advance.

Figure 6:
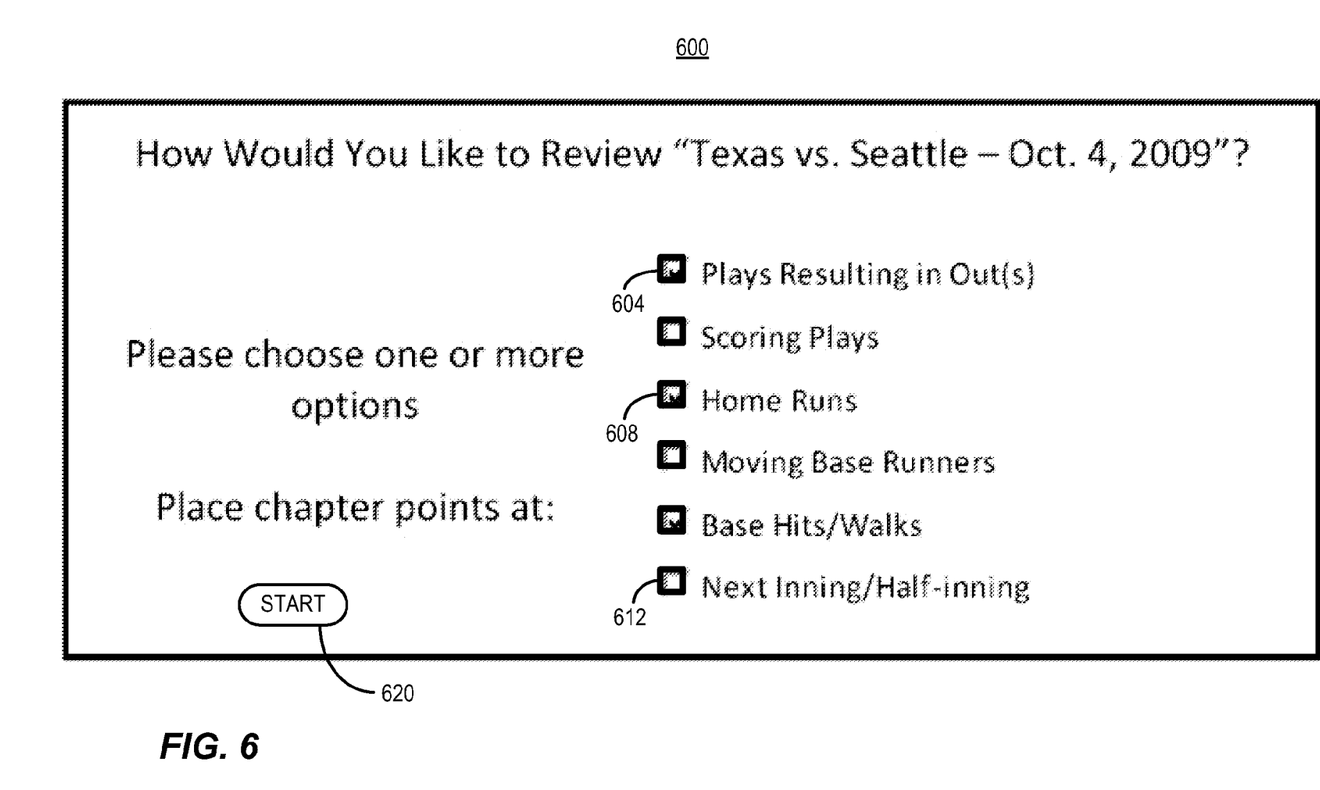
FIG. 6 is an example playback window for selection of events that are to be retrieved using chapter marks made in a manner consistent with certain embodiments of the present invention.

With reference to FIG. 6, menu 600 illustrates an example user interface window wherein the user is asked how they would like to review a particular recorded baseball game. Chapter points are filtered and activated based on the selected options. The chapter points can be analyzed and categorized either at the time of marking the chapter points or at the time of playback or offline without limitation. In this example, the user can select any or all of the following types of plays which are deduced from analysis of changes in the score graphic:

Plays resulting in out(s);
Scoring plays;
Home runs;
Moving base runners;
Base hits/walks; and
Next inning/half-inning.

In the illustrated example, the user has utilized a remote control in a conventional manner or other user interface to select plays resulting in outs at 604, home runs at 608 and base hits/walks at 612. The viewing starts when the user selects "start" button 620 from the menu using a remote controller.

While analysis of a baseball game and a football game are briefly described herein, the technique described may be applied to other sports such as tennis, basketball, soccer, hockey, etc., or other games such as poker and contests, etc., with each sport having a particular algorithm applied to analysis of the changes to the score graphic. Moreover, both digital television sets and PVR devices or STBs having PVR functions (each of which has PVR functionality) can be utilized to realize implementations consistent with certain embodiments consistent with the present invention without limitation.

Figure 7:
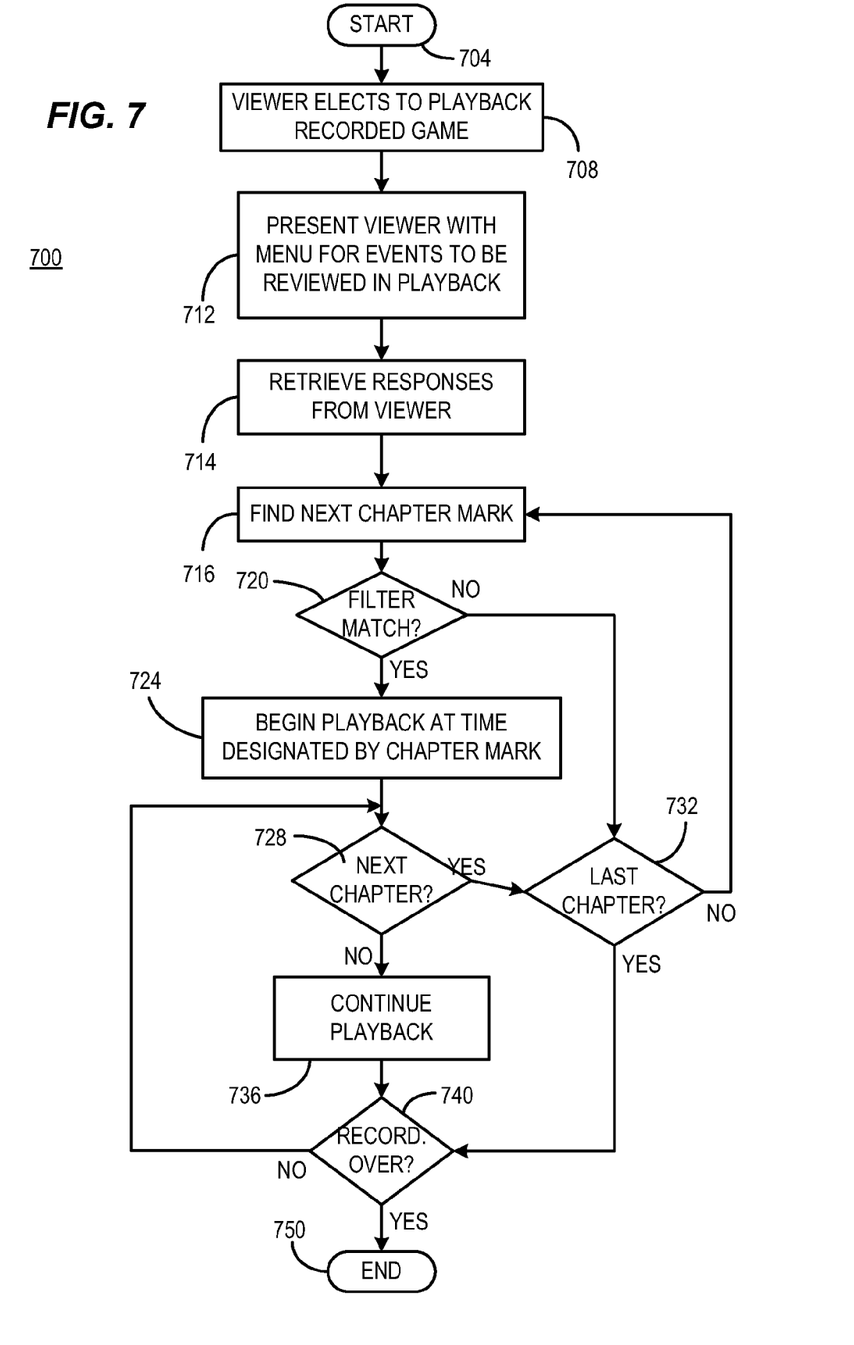
FIG. 7 is an example of an illustrative process for playback using the chapter marks established in a manner consistent with certain embodiments of the present invention.

An example of a playback method utilizing the menu 600 is depicted in FIG. 7 as process 700 starting at 704 after which the viewer elects to play back a recorded program containing a sports program in general or a baseball game in this particular example at 708. The viewer is presented with a menu 600 which provides for selections of several types of plays that the viewer wishes to see in his or her playback at 712. Once all selections are made at 714, the viewer initiates the start of the viewing experience from the menu or via any equivalent command and the process 700 seeks the first (the next is first in this case) chapter mark at 716. In other words, on user command, the playback "jumps" or advances quickly to the time associated with the chapter mark. The process continues to 720 where the changes in the score graphic are analyzed or filtered to determine if a match has been found to the criteria established by the viewer in menu 600. If so, playback begins at 724 at a point in time just prior to the change event that took place in the score graphic. This process will be discussed further at a later point in this document.

Once playback begins, in this implementation, it continues until the viewer issues a command from the remote controller or other suitable interface that indicates that he or she wishes to proceed to the next chapter mark at 728. Assuming the prior chapter mark was not the last chapter mark as determined at 732, this election by the viewer results in the process returning to 716 where the next chapter mark is found and the process repeats. Until such time as the viewer elects to move to the next chapter mark, playback continues at 736 until the recording (game) ends at 740 thereby ending the process at 750. If the user elects to go to the next chapter at 728, but there are no further chapters marked, the recording simply continues playback at 736 until the recording ends or is ended by viewer intervention (at any time). If the viewer attempts to proceed to a next chapter and there is none, a message can be provided if desired between 732 and 740 or alternative action such as proceeding to the end can be carried out in alternative implementations. Other variations will occur to those skilled in the art upon consideration of the present teachings.

The particular analysis carried out at 720 can take many forms depending on the amount of information conveyed in the score graphic and depending upon the particular sport. However, in all cases, analysis of the score graphic provides a large amount of information that is likely to be of direct interest to one wishing to view only highlights. A simple example analysis is presented in FIG. 8 of the analysis carried out to determine if a change in the baseball score graphic is indicative of any of the types of plays listed in the example menu 600. In this example analysis, at 802 the change in the score graphic is analyzed at to determine if an "out" count has changed. If so, the filter registers the criterion of plays resulting in "outs" as being matched at 806. The analysis can proceed whether the result is affirmative or negative at 802 to 810 to determine if a score changed. (Note that that both an "out" and a score change can occur even on the third out in certain circumstances, hence the full analysis can be conducted in each case to detect special circumstances not itemized herein.)

Figure 8:
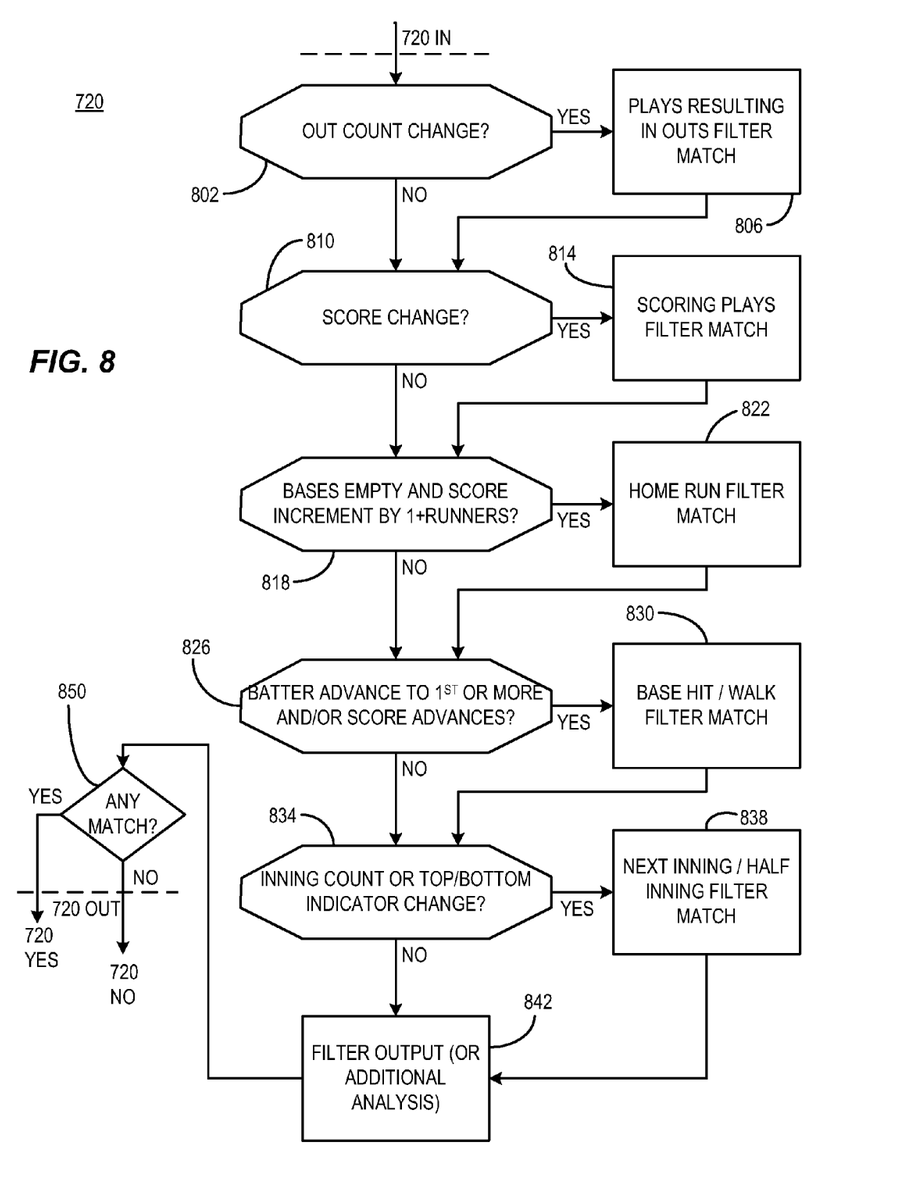
FIG. 8 is a simplified filtering system for filtering results of changes in a baseball score graphic in a manner consistent with certain embodiments of the present invention.

If the score changed at 810, then the filter registers the criterion of scoring plays as being matched at 814, and control passes from either 810 if no match or 814 if matched to 818. If the bases are empty and the score has incremented by one plus the previous number of runners on base at 818, then the criterion of a home run is met at 822 and control passes to 826 whether a match was made at 818 as indicated at 822 or not.

At 826, if the batter advances to first base or beyond and/or the score advances this is indicative of a base hit (including a home run) or a walk and the filter match criteria for a base hit/walk is registered at 830. Control then passes to 834 from either 830 if a match is made or from 826 if not.

At 834, if an inning-count or the top of inning/bottom of inning indicator changes, then the criteria for an inning change or top/bottom change filter match is met at 838. Control then passes to 842. The analysis presented is rudimentary and may be more complex as other scenarios are examined. Hence, the filter output can either be examined at 842, or further processing through a more complex decision tree (possibly using the results of prior filter matches) can be carried out at 842. If any match is made to the filter criteria at 850, an output of 720 for "yes" is produced, while no matches for 850 will result in a "no" output 720. It will be evident, that the above process is easily modified to bypass any tests that are not elected as items that the viewer desires to see in menu 600 by simply bypassing that portion of the process in accord with flags set when the viewer makes selections from menu 600.

Figure 9:
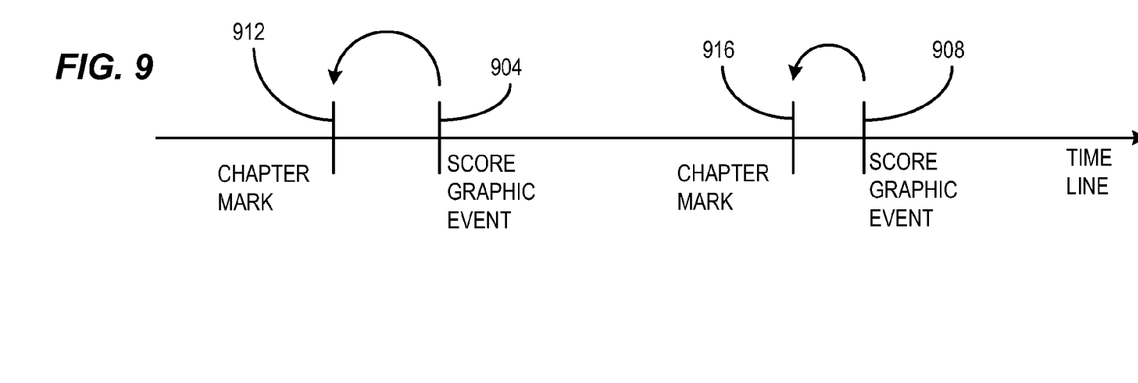
FIG. 9 is an illustrative time line for score graphic events and chapter marks consistent with certain embodiments of the present invention.

Marking of score graphic events can be handled in many ways, and the marks can be stored as a part of the audio or video files or part of metadata or user data in a separate file without limitations. Several examples are presented herein as to how the markings can be situated in time, but those skilled in the art will appreciate that other techniques can be used within the scope of the present teachings upon consideration of these teachings. The score graphic information is a strong indicator that an interesting plays has occurred in the immediate past (e.g., generally within the last few seconds or possibly one or two minutes). FIG. 9 shows one technique for addressing the time discrepancy between the score graphic event and the time the viewer would likely wish to begin viewing the unfolding play itself. In this example time line, score graphic events 904 and 908 represent noteworthy score graphic events respectively. If one correctly assumes that the play of interest occurred just prior to the time of the score graphic event, one can actually place the chapter mark at times indicated by 912 and 916. Then, during playback the playback process can be simplified to go directly to the chapter mark and begin play.

However, if the system is devised to intelligently place chapter marks, it can be noted that some events are more likely than others to have taken place further in the past (prior to the score graphic event). For example, in football, one may wish to see several minutes of play (covering a span of possibly several downs) prior to a touchdown, but only just enough time to capture an actual field goal or point after—say twenty or thirty seconds. Hence, if an analysis of the type of event is carried out during registration, storage or analysis of the chapter marks, the location of the chapter marks relative to the score graphic event can be customized to more efficiently capture the desired highlights.

Figure 10:
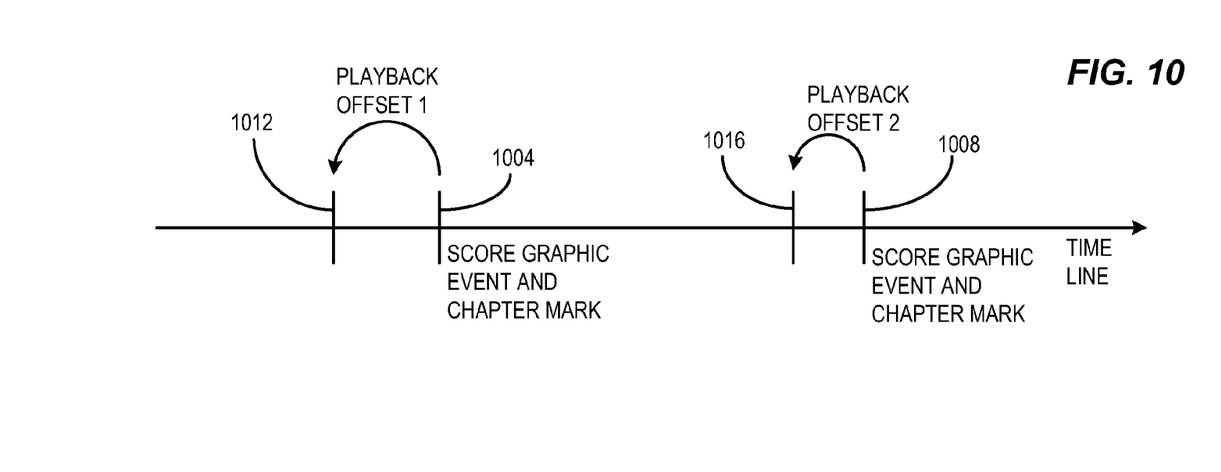
FIG. 10 is an illustrative time line for score graphic events that trigger playback at a time interval offset in a manner consistent with certain embodiments of the present invention.

FIG. 10 depicts a time line for setting a playback offset during playback. This offset can either be recorded with the chapter mark or during analysis and playback. In this case, score graphic events 1004 and 1008 correspond in time to the chapter mark, but a playback time offset is used to start playback so as to capture the significant highlight interval. The playback time offsets can again be matched to the type of event if desired as indicated by playback offset 1 and playback offset 2 so that playback begins at 1012 or 1016 respectively in certain implementations, or a single offset value can be used for all events. It is noted that the offset can be greater for some types of changes in the graphic than for others. An analysis can be performed as disclosed to determine what type of action has, or is likely to have occurred. For example, the unfolding in a baseball game of a grand slam would likely be expected to take more time than a stolen base, thus the offset should be bigger. This variability of the offset time can be preprogrammed based on analysis of historical game events, set by a user action or ignored and set as a fixed value in various implementations without limitation.

In a further example, a viewer interested only in how his favorite players are batting in a baseball game may wish to derive the chapter marks in such a manner so as to only show intervals of time in which his favorite team is batting. Conversely, a viewer only interested in his favorite pitcher may only want to take note of the time when his favorite team is in the field. Thus for cases in which the score graphic event involves only an inning or half-inning change, a small or zero offset might be appropriate. Many other variations will occur to those skilled in the art.

Figure 11:
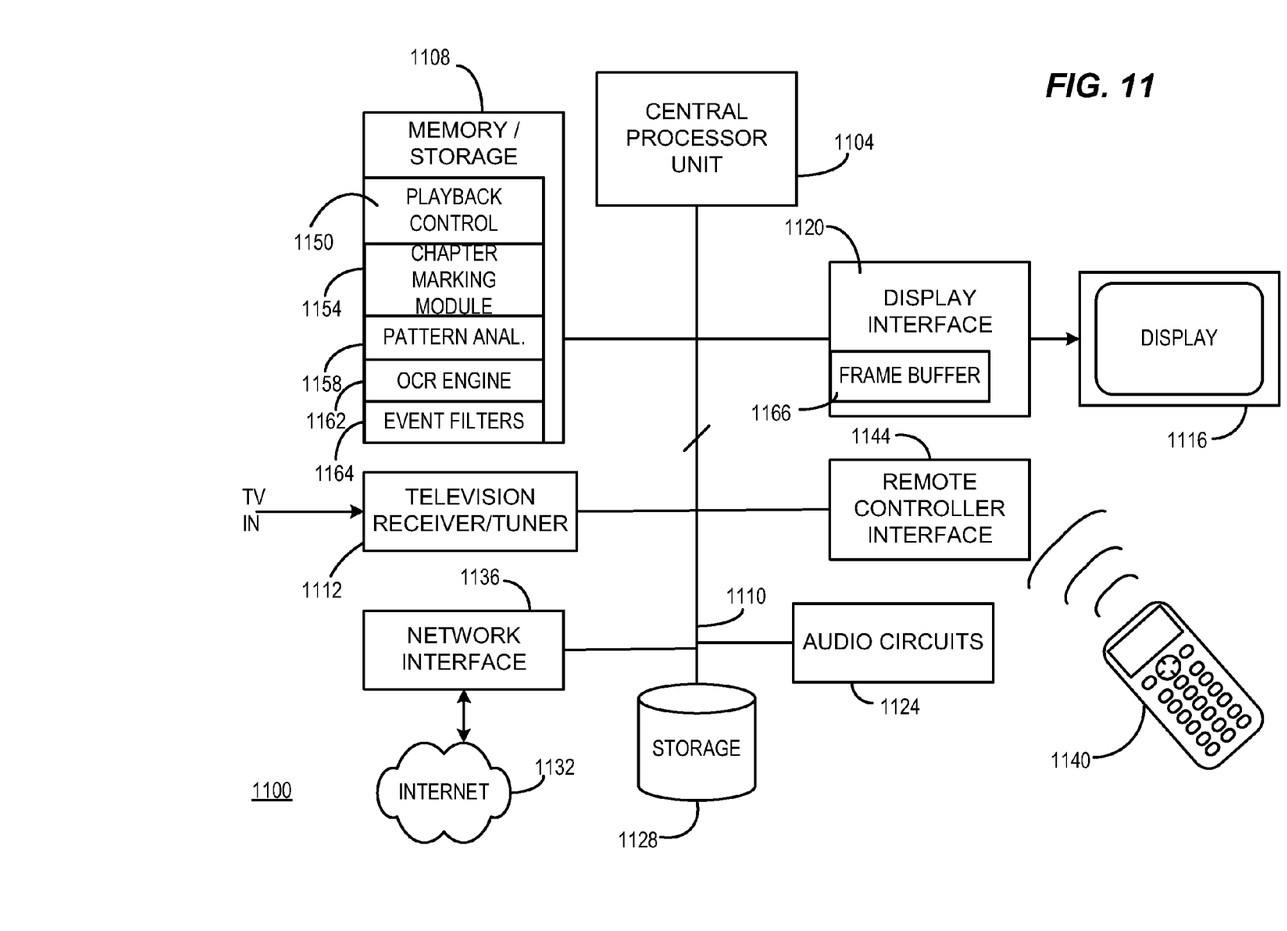
FIG. 11 is an example block diagram of a television receiver device that operates in a manner consistent with certain embodiments of the present invention.

The processes previously described can be carried out on a television receiver device (e.g., STB, PVR or similar system) or a service provider as noted below using a device operating with one or more programmed processors such as system 1100. In such a system 1100 as depicted in FIG. 11, a computer processor 1104 oversees operation of the processes described herein as well as general control of the television receiver device. Computer system 1100's central processor unit (CPU) 1104 has one or more associated buses 1110 used to connect the central processor unit 1104 to memory 1108 such as Random Access Memory and/or Non-Volatile Memory in combination with disc storage in any suitable manner and in any suitable combination. A television receiver/tuner/decoder 1112 receives television signals, digital or analog in order to tune and decode for display on a display 1116 via display interface 1120 and playback audio via audio circuits 1124.

System 1100 also has access to optical, mechanical (hard disc) or solid state storage 1128 for storing the recorded games discussed herein as well as the bookmarks and other bulk data or computer programs including, but not limited to, program files and data files. System 1100 may also be coupled to a local area network (LAN) and/or wide area network (WAN) and/or the Internet 1132 using a network connection 1136 such as an Ethernet adapter. A user interface can be provided by use of a remote controller 1140 that communicates either one-way or two-way with the system 1100 via the remote control interface 1144. The viewer can utilize the remote controller 1140 in conjunction with an on-screen user interface to make menu selections and to "jump" to a time in the playback associated with the chapter point.

Memory 1108 stores an operating system (not shown) as well as operational computer programs used in carrying out the functions described previously. However, it is noted that the functions previously described can be carried out in hardware equivalent logic devices specially designed for this purpose in equivalent embodiments. In this arrangement, which should not be considered limiting, the memory and storage 1108 includes a program module for playback control 1150, a program module 1154 for carrying out the chaptering process described previously, a pattern matching module 1158 that carries out pattern matching functions (e.g., for matching patterns in section 532 of score graphic 500), an optical character reader (OCR) engine 1162 used to read text within blocks of the score graphic, and event filter logic modules 1164 that carry out event filtering functions such as those depicted in 720 of FIG. 8. The display interface 1120 incorporates a frame buffer memory 1166 that stores one or more frames of video for presentation to display 1116. This frame memory can be accessed for analysis of a current display of the score graphic by CPU 1104 using the program modules depicted in memory 1108.

Those skilled in the art will appreciate that many variations in the arrangement of the program modules and the hardware just described are possible without departing from embodiments consistent with the present invention.

As described above, the receiver device with PVR functions analyzes the video to determine score graphic events that are indicative of creation of chapter points. An alternative embodiment is for a service provider to perform an analysis algorithm such as that described herein and to download the chapter points (event records) to the receiver as a form of metadata. The metadata delivered to the receiver could be in the form of a list of event records associated with a given program title. Each event record in the program would provide the time of the event and an event type. Types of events for an example baseball game could be change in outs, change in innings, change in base runner, change in score, etc. The receiver can take this metadata and create the desired user interface. Metadata such as this can be sent in real-time as well, and aggregated for later use in the receiver, or can be sent as a batch at a time after the presentation of the programming.

Yet another variation is to provide the receiver a template of the score graphic that is pertinent to a particular program. The template can be transmitted from the broadcaster (e.g., as metadata) and received by the receiver or stored at the receiver in a database of known score graphic templates, for example. Such a template can provide information to aid in location of score graphic data, such as (for an example baseball score graphic):

on-screen coordinates where the score graphic and/or elements thereof are located;

coordinates (e.g., for rectangular areas) containing team names;

coordinates (e.g., for rectangular areas) containing half of inning;

coordinates (e.g., for rectangular areas) containing inning number;

coordinates (e.g., for rectangular areas) containing count of balls;

coordinates (e.g., for rectangular areas) containing count of strikes;

coordinates (e.g., for rectangular areas) containing outs; and coordinates of first, second, and third bases graphic representations.

This method saves the receiver the trouble of analyzing the video and the graphics to derive this information, but in other implementations, the receiver can find the graphic by looking for displayed elements that have a geometry that is stationary and has changing elements consistent with a score graphic. Other score graphics can contain information relating to other sports, games and competitions between teams or competitors.

Still another variation is to involve the user in the analysis process. A user interface could be designed to ask the user to identify the parts of the score graphic. Each area could be associated with a data type. The user can identify the type as "team name," or "outs" or "runs" or "balls/strikes," etc. The analysis in that case would only need to go so far as to identify the parts. This can be done by an analysis of the display (so called "screen scraping"), where the areas of constant video (the score graphic area) can be analyzed and determine to hold text/numbers or symbols. The location of the score graphic can be readily found by comparing many successive video frames to notice unchanging areas. It is likely that enough pixels will change in one second interval to eliminate them from being in the "score graphic area", and typically, score graphics are rectangular (or nearly so) in shape. This renders analysis of an image to find the location of a score graphic a relatively straightforward video analysis.

Once a score graphic is located and the parts of the score graphic are identified, the preceding processes can be carried out to facilitate the rapid viewing of highlight points in a televised sports program in the manner described. Thus, a method consistent with certain implementations involves at a television receiver device, receiving a television program depicting a sports program, where data associated with the sports program is represented in a score graphic that is to be displayed on a television display overlaying images of the sports program; storing the television program depicting the sports program; analyzing the score graphic using optical character recognition and pattern matching to identify a change in at least one element of data displayed in the score graphic from one video frame to a subsequent video frame; storing data associated with the time that the change in the element of data displayed in the score graphic occurred, where the data includes an actual time of occurrence of the change in the element of data displayed in the score graphic; playing the stored television program; filtering the data change in the score graphic display according to at least one filter criterion to determine a category of event associated with data change in the score graphic display; upon receipt of a signal generated by a viewer action, jumping to a point in playback time associated with the mark that occurs at a time prior to a score graphic event time, where the jumping is to a point in time that is offset from the actual score graphic event time by an offset time, and where the score graphic event record meets the at least one filter criterion; and where the at least one filter criterion is selected by a user from a menu of events that the viewer chooses to use as chapter marks.

Another method involves at a television receiver device, receiving a television program depicting a sports program, where data associated with the sports program is represented in a score graphic that is to be displayed on a television display overlaying images of the sports program; storing the television program depicting the sports program; analyzing the score graphic to identify a change in at least one element of data displayed in the score graphic from one video frame to a subsequent video frame; and storing an event record associated with the time that the change in the element of data displayed in the score graphic occurred.

In certain implementations, the event record represents an actual time of occurrence of the change in the element of data displayed in the score graphic. In certain implementations, the chapter mark is derived based on a time preceding the time of the event record. In certain implementations, the analyzing comprises optical character recognition analysis. In certain implementations, the analyzing comprises pattern matching analysis. In certain implementations, the method involves playing back the stored television program, and upon receipt of a signal generated by a viewer action, jumping the playback to a point in time associated with a chapter mark. In certain implementations, the jumping involves jumping to a time prior to an event record by a prescribed time offset. In certain implementations, analyzing the score graphic involves determining a type of action that occurred in the sports program. In certain implementations, the prescribed time offset is established on a basis of the type of action determined by the analyzing. In certain implementations, the method further involves filtering the data change in the score graphic display according to at least one filter criterion to determine a category of event associated with data change in the score graphic display. In certain implementations, the jumping is to a point in time associated with a chapter mark that meets the filter criterion. In certain implementations, the method involves filtering the data change in the score graphic display according to at least one filter criterion to determine a category of event associated with data change in the score graphic display. In certain implementations, the at least one filter criterion is selected by a user from a menu of events that the viewer may wish to chapter mark. In certain implementations, the method further involves locating the score graphic and identifying elements of graphics or text data within the score graphic. In certain implementations, the analyzing the score graphic is carried out during reception of the television program. In certain implementations, the method involves locating the score graphic by using a template. In certain implementations, the template is received by the television receiver device or stored at the television receiver device in a database of known score graphic templates.

A computer readable storage device such as a non-transitory storage medium can be used to store instructions which, when executed on one or more programmed processors, carry out any of the methods described herein.

A device consistent with certain implementations has a television receiver receiving a television program depicting a sports program, where data associated with the sports program is represented in a score graphic that is to be displayed on a television display overlaying images of the sports program and a processor. A storage device stores the television program depicting the sports program under control of the processor. The processor analyzes the score graphic to identify a change in at least one element of data displayed in the score graphic from one video frame to a subsequent video frame. The processor further storing an event record associated with the time that the change in the element of data displayed in the score graphic occurred.

In certain implementations, a chapter mark is derived based on a time preceding the time of the change in the element of data displayed in the score graphic. In certain implementations, the analyzing comprises optical character recognition analysis carried out in the processor. In certain implementations, the analyzing comprises pattern matching analysis. In certain implementations, the processor retrieves and plays back the stored television program, and upon receipt of a signal generated by a viewer action via a user interface, jumps the play to a point in time associated with a chapter mark. In certain implementations, the jumping involves jumping to a time prior to an event mark time by a prescribed time offset. In certain implementations, the processor analyzes the score graphic by determining a type of action that occurred in the sports program. In certain implementations, the prescribed time offset is established on a basis of the type of action determined by the analyzing. In certain implementations, the processor filters the data change in the score graphic display according to at least one filter criterion to determine a category of event associated with data change in the score graphic display. In certain implementations, the jumping is to a point in time associated with a chapter mark that meets the filter criterion. In certain implementations, filtering the data change in the score graphic display according to at least one filter criterion to determine a category of event associated with data change in the score graphic display. In certain implementations, the at least one filter criterion is selected by a user from a menu of events that the viewer may wish to chapter mark. In certain implementations, the analyzing the score graphic is carried out during reception of the television program. In certain implementations, the processor is further programmed to locate the score graphic by using a template. In certain implementations, the template is received by the television receiver device or stored at the television receiver device in a database of known score graphic templates.

Those skilled in the art will recognize, upon consideration of the above teachings, that certain of the above exemplary embodiments are based in part upon use of one or more programmed processors. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein are or may be implemented using one or more programmed processors executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping, time outs, etc. can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method, comprising:
at a television receiver device, receiving a television program depicting a sports program, where data associated with the sports program is represented in a score graphic that is to be displayed on a television display overlaying images of the sports program;
where the television receiver device is tuned to a selected television network, and where a location on the television display where the score graphic appears is determined by matching the displayed image to one or more template used by the selected television network;
storing the television program depicting the sports program;
analyzing the score graphic using optical character recognition and pattern matching to identify a change in at least one element of data displayed in the score graphic from one video frame to a subsequent video frame;
storing data associated with the time that the change in the element of data displayed in the score graphic occurred, where the display change is identified by optical character recognition and pattern matching analysis, and where the data includes an actual time of occurrence of the change in the element of data displayed in the score graphic where the change in the element of data displayed in the score graphic is identified by optical character recognition and pattern matching analysis;
playing the stored television program;
filtering the data change in the score graphic display according to at least one filter criterion to determine a category of event associated with data change in the score graphic display;
upon receipt of a signal generated by a viewer action, jumping to a point in playback time associated with the mark that occurs at a time prior to a score graphic event time that is offset from the actual score graphic event time by an offset time, and where the score graphic event record meets the at least one filter criterion; and
where the at least one filter criterion is selected by a user from a menu of events that the viewer chooses to use as chapter marks.

2. A method, comprising:
at a television receiver device, receiving a television program depicting a sports program, where data associated with the sports program is represented in a score graphic that is to be displayed on a television display overlaying images of the sports program;
where the television receiver device is tuned to a selected television network, and where a location on the television display where the score graphic appears is determined at least in part by matching the displayed image to one or more templates used by the selected television network;
storing the television program depicting the sports program;
analyzing the score graphic to identify a change in at least one element of data displayed in the score graphic from one video frame to a subsequent video frame, where the change in the at least one element of displayed data is identified by optical character recognition and pattern matching analysis;
storing an event record associated with the time that the change in the element of data displayed in the score graphic occurred, where the change in the at least one element of displayed data is identified by optical character recognition and pattern matching analysis; and;
upon receipt of a signal generated by a viewer action, jumping to a point in playback time that is prior to and offset from the time that the change in the element of data displayed in the score graphic occurred by an offset time.

3. The method according to claim 2, where the event record represents an actual time of occurrence of the change in the element of data displayed in the score graphic.

4. The method according to claim 2, where a chapter mark is derived based on the offset time proceeding the time of the event record.

5. The method according to claim 4, further comprising playing back the stored television program, and upon receipt of a signal generated by a viewer action, jumping the playback to the chapter mark.

6. The method according to claim 5, further comprising filtering the data change in the score graphic display according to at least one filter criterion to determine a category of event associated with data change in the score graphic display.

7. The method according to claim 6, where the jumping is to a point in time associated with a chapter mark that meets the filter criterion.

8. The method according to claim 2, where the analyzing comprises optical character recognition analysis.

9. The method according to claim 2, where the analyzing comprises pattern matching analysis.

10. The method according to claim 2, where analyzing the score graphic comprises determining a type of action that occurred in the sports program.

11. The method according to claim 10, where the prescribed time offset is established on a basis of the type of action determined by the analyzing.

12. The method according to claim 2, further comprising filtering the data change in the score graphic display according to at least one filter criterion to determine a category of event associated with data change in the score graphic display.

13. The method according to claim 12, where the at least one filter criterion is selected by a user from a menu of events that the viewer may wish to chapter mark.

14. The method according to claim 2, further comprising identifying elements of graphics or text data within the score graphic.

15. The method according to claim 2, where the analyzing the score graphic is carried out during reception of the television program.

16. The method according to claim 2, where the template is received by the television receiver device or stored at the television receiver device in a database of known score graphic templates.

17. A non-transitory computer readable storage device storing instructions which, when executed on one or more programmed processors, carry out a method according to claim 2.

18. A device, comprising:
- a television receiver receiving a television program depicting a sports program, where data associated with the sports program is represented in a score graphic that is to be displayed on a television display overlaying images of the sports program, where the television receiver device is tuned to a selected television network;
- a processor;
- a storage device storing the television program depicting the sports program under control of the processor;
- the processor determining a location on the television display where the score graphic appears is determined at least in part by matching the displayed image to one or more templates used by the selected television network;
- the processor analyzing the score graphic to identify a change in at least one element of data displayed in the score graphic from one video frame to a subsequent video frame, where the change in the at least one element of displayed data is identified by optical character recognition and pattern matching analysis;
- the processor storing an event record associated with the time that the change in the element of data displayed in the score graphic occurred, where the change in the at least one element of displayed data is identified by optical character recognition and pattern matching analysis; and
- upon receipt of a signal generated by a viewer action, the processor being programmed to jump to a point in playback time that is prior to and offset from the time that the change in the element of data displayed in the score graphic occurred by an offset time.

19. The device according to claim 18, where a chapter mark is derived based on the time proceeding the time of the change in the element of data displayed in the score graphic by the offset time.

20. The device according to claim 19, where the jumping comprises jumping to a chapter mark.

21. The device according to claim 20, where analyzing the score graphic comprises determining a type of action that occurred in the sports program.

22. The device according to claim 21, where the prescribed time offset is established on a basis of the type of action determined by the analyzing.

23. The device according to claim 18, where the analyzing comprises optical character recognition analysis carried out in the processor.

24. The device according to claim 18, where the analyzing comprises pattern matching analysis.

25. The device according to claim 18, further comprising the processor retrieving and playing back the stored television program, and upon receipt of a signal generated by a viewer action via a user interface, jumping the play to a point in time associated with a chapter mark.

26. The device according to claim 25, further comprising filtering the data change in the score graphic display according to at least one filter criterion to determine a category of event associated with data change in the score graphic display.

27. The device according to claim 25, where the jumping is to a point in time associated with a chapter mark that meets the filter criterion.

28. The device according to claim 18, further comprising filtering the data change in the score graphic display according to at least one filter criterion to determine a category of event associated with data change in the score graphic display.

29. The device according to claim 28, where the at least one filter criterion is selected by a user from a menu of events that the viewer may wish to chapter mark.

30. The device according to claim 18, where the analyzing the score graphic is carried out during reception of the television program.

31. The method according to claim 18, where the template is received by the television receiver device or stored at the television receiver device in a database of known score graphic templates.

* * * * *